US 8,819,348 B2

(12) United States Patent
Gaither et al.

(10) Patent No.: US 8,819,348 B2
(45) Date of Patent: Aug. 26, 2014

(54) ADDRESS MASKING BETWEEN USERS

(75) Inventors: Blaine D. Gaither, Fort Collins, CO (US); Benjamin D. Osecky, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2092 days.

(21) Appl. No.: 11/485,409

(22) Filed: Jul. 12, 2006

(65) Prior Publication Data
US 2008/0016288 A1 Jan. 17, 2008

(51) Int. Cl.
G06F 12/00 (2006.01)
G06F 13/00 (2006.01)
G06F 13/28 (2006.01)
G06F 9/26 (2006.01)
G06F 9/34 (2006.01)
G06F 12/14 (2006.01)
G06F 12/08 (2006.01)

(52) U.S. Cl.
CPC ........ *G06F 12/0842* (2013.01); *G06F 12/1408* (2013.01); *G06F 12/0864* (2013.01)
USPC ............ 711/148; 711/127; 711/147; 711/216

(58) Field of Classification Search
USPC .................................. 711/127, 147, 148, 216
See application file for complete search history.

(56) References Cited

U.S. PATENT DOCUMENTS

| | | | |
|---|---|---|---|
| 6,115,802 A * | 9/2000 | Tock et al. ..................... | 711/216 |
| 6,381,676 B2 * | 4/2002 | Aglietti et al. ................ | 711/133 |
| 6,662,173 B1 * | 12/2003 | Hammarlund et al. ........... | 707/2 |
| 7,054,950 B2 * | 5/2006 | Putzolu .......................... | 709/238 |
| 7,529,907 B2 * | 5/2009 | Nemirovsky et al. ............. | 712/5 |
| 2001/0052053 A1 * | 12/2001 | Nemirovsky et al. .......... | 711/138 |
| 2003/0221085 A1 * | 11/2003 | Huras ............................ | 711/220 |
| 2004/0078590 A1 * | 4/2004 | Ellison et al. ................. | 713/200 |
| 2005/0027963 A1 | 2/2005 | Hum et al. | |
| 2005/0283604 A1 * | 12/2005 | Deshpande et al. .......... | 713/160 |

FOREIGN PATENT DOCUMENTS

| | | |
|---|---|---|
| GB | 2 412 987 | 10/2005 |
| WO | WO 02/056184 | 7/2002 |
| WO | WO 2004/055678 | 7/2004 |

OTHER PUBLICATIONS

HP Forum Archive 04, "http://www.hpmuseum.org/cgi-sys/cgiwrap/hpmuseum/archv004.cgi?read=7254" Dec. 12-13, 2000.*
"Microsoft Computer Dictionary", Fifth Edition, Microsoft press, May 1, 2002, p. 329.*

(Continued)

*Primary Examiner* — Michael Alsip

(57) ABSTRACT

Provided is a method for uniquely masking addressing to the cache memory for each user, thereby reducing risk of a timing attack by one user on another user. The method comprises assigning a first mask value to the first user and a second mask value to the second user. The mask values are unique to one another. While executing a first instruction on behalf of the first user, the method comprises applying the first mask value to set selection bits in a memory address accessed by the first instruction. While executing a second instruction on behalf of the second user, the method comprises applying the second mask value to set selection bits in the memory address accessed by the second instruction. The result offers an additional level of security between users as well as reducing the occurrence of threads or processes contending for the same memory address.

20 Claims, 3 Drawing Sheets

(56) References Cited

OTHER PUBLICATIONS

David B. Kirk, "SMART(Strategic Memory Allocation for Real-Time) Cache Design", Proceedings of the Real Time Systems Symposium, Dec. 5-7, 1989, Los Alamitos, IEEE COMP, pp. 9.

German Office Action, dated Sep. 20, 2010, 2 pages.
Colin Percival, "Cache Missing for Fun and Profit," 13 pp., May 13, 2005.
Colin Percival, "Hyper-Threading Considered Harmful," May 13, 2005, 4 pp.

\* cited by examiner

ADDRESS MASKING BETWEEN USERS

BACKGROUND

The simultaneous execution of multiple threads in a hyper-threading system creates various security problems. One class of security problems involved what has been termed a "covert timing channel attack." In a covert timing channel attack, a first thread may be executing instructions for a first user, e.g., an encryption program, while a second malicious thread is executing instructions for a second user, seeking to obtain information from the first thread, such as cryptographic keys, by monitoring the execution of the first thread and accesses to the cache for the first thread.

In addition to security problems, another type of problem exists in hyper-threading systems. This problem, referred to herein as contending for the same cache set, is caused when several portions of memory map to the same cache set. Specifically, a hot spot in a memory block is a set of memory locations in the block that are frequently accessed. When multiple hot spots in memory blocks map to, or line up to, the same cache set, multiple threads end up contending for entries in the same cache set.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
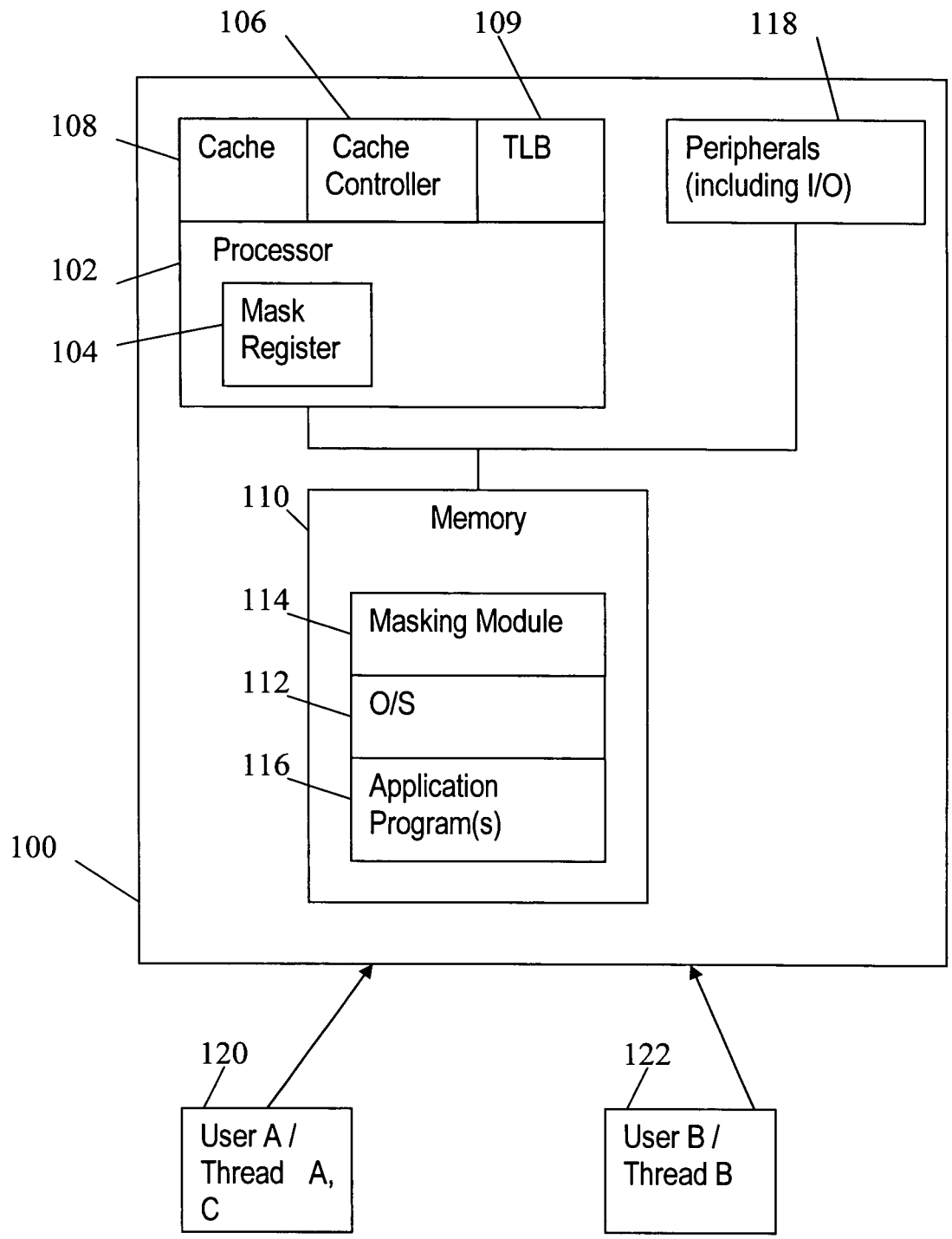
FIG. 1 shows a block diagram of a hyper-threading computer system implementing a masking module in an exemplary embodiment in accordance with the invention.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In computer engineering and software, a thread may be generically defined as an independent flow of control or stream of execution within an executing application. A thread may include a context (e.g., a program counter and a register set) and an instruction sequence that can be executed independently of other instruction sequences. Threads are distinguished from traditional multi-tasking operating system processes in that processes are independent, carry state information, may have separate address spaces, and interact only though system-provided inter-process communication mechanisms. Multiple threads, by comparison, share the state information of a single process, and share memory and other resources directly. Each process has at least one thread, and in some operating systems, a process can have more than one thread. Each thread may generate memory read or store requests. A memory request may be serviced by a cache or if it "misses" the cache, by the main memory.

Technology developments have enabled simultaneous multi-threading. Simultaneous multi-threading permits multiple threads to execute different instructions in a single clock cycle, using the execution units that the first thread left spare to execute one or more other threads. Hyper-threading is an implementation of simultaneous multi-threading that works by duplicating certain portions of the processor (e.g., those that store architectural state) but not duplicating main execution resources. In effect, hyper-threading allows the process to appear to the operating system as two "logical" processors, thereby allowing the operating system to schedule two threads or processes simultaneously. In hyper-threading environments, threads additionally share access to memory caches.

In various embodiments, there is additionally switch on event multi-threading, such as is implemented on the Sun T1000™ system using the Niagra™ processor. Switch on event multi-threading differs in the manner in which instructions are executed, in that the processor rapidly switches between threads, rather than executing them simultaneously. For purposes of this disclosure, simultaneous multi-threading, switch on event multi-threading, and any other form of multi-threading yet to be developed are equivalent, in the sense that switching between threads, or simultaneous execution, occurs at such a rate as to be transparent to system users.

Various operating systems ("O/S"), including hypervisors or hyper-threading systems as described herein, support multiple users being logged in at the same time, and generally, each user is unaware, for computing purposes, of the access to, and use of, the system by the others. While executing processes for each of the multiple users, a number of threads may be executed, at least one thread per user.

Security problems existing in hyper-threading or hypervisor computer system environments may be addressed by changing the method of mapping the cache line address onto cache sets as between users logged into the computer system. The present disclosure utilizes a register in the processor designated as the mask register. This mask register is loaded with a unique mask value for each thread executed on the system. It is assumed for purposes of this disclosure that the mask register is large compared to the number of threads (and thereby a large number of users that may potentially log in to the system at any given time) such that a unique random mask value corresponds to each user. Each time the processor switches between users, the mask value assigned to that user is hashed into the set-selection bits of that user's memory requests on the accessed cache, thus randomizing the set index (i.e., set mapping) as between different users. The hashing algorithm may be one of a number of transformation functions, including an exclusive OR ("XOR") function.

By doing so, users will have individually randomized cache set mapping, thereby reducing the occurrence of mapping to the same physical set elements in the cache as another other user. This masking, unpredictable between users, reduces, if not eliminates, the risk that a malicious user will steal valuable information, such as cryptographic keys, from another via a cache covert timing channel. The masking between users will also result in different users' hot instructions and data mapping to entirely different cache sets, making it much less likely that they will be contending for the same cache entries.

It is noted that hypervisor guest processes may use more than one thread. Each thread for a given guest process may share a common mask value, in that the threads share data and are all run on behalf of the same user.

Referring to FIG. 1, a block diagram of a computer system 100 operable for hyper-threading, with multiple users, is shown. The computer system 100 comprises a processor 102, cache controller 106, cache memory 108, a translation lookaside buffer ("TLB") 109, peripherals 118 and memory 110. Processor 102, configured for hyper-threading, implements a mask register 104, which is a privileged register (i.e., loadable by the hypervisor or operating system but not by the user code) available to the cache(s). The mask register 104 stores mask values for running threads, and supplies the proper mask value for each user's memory requests. The mask register 104 may be located within the processor 102 such that when the processor switches between process contexts, the mask register 104 associates a unique mask value with each separate user's process or thread. Alternatively, the mask register 104 may be operatively coupled to the processor 102, rather than located within the processor 102. Note that some address ranges may be exempted from application of values from the mask register 104, for example, in the case of cache sets used solely by the operating system 112 (i.e., the hypervisor), and not utilized by user code, or for data structures shared between users such as libraries, or System V shared memory.

Specifically, in an environment where the processor 102 switches between multiple threads, the processor 102 contains register sets that define the program counter, current register state, and the like in an architected state. When starting a new thread A 120, the processor launches the thread with the data stored for the architected state for that thread A 120, and the processor gathers up the architected state for the thread B 122 that was being executed, and saves it until execution of the particular thread B 122 is resumed. In various embodiments, the mask register 104 may be an additional portion of this architected state.

The cache controller 106 determines when memory references from the processor 102 score hits in the cache 108. The TLB 109 is a cache associated with processor 102 that keeps track of recently used address mappings, used to improve the speed of address translation. The TLB 109 may reside between the processor 102 and the cache 108, or between the cache 108 and main memory 110. The TLB 109 is, in effect, a cache, and may similarly apply the masking scheme of the present disclosure as a security or performance improvement measure.

Memory references that hit in cache 108 are satisfied with data read from the cache 108, while memory references that miss in cache 108 are satisfied with data read from main memory 110. The memory 110 additionally stores application programs 116, portions, or all, of an operating system 112, and a masking module 114 for managing masking values for users of 1) application programs 116 and 2) operating system routines. The masking module 114 associates a unique mask value for each user, for all active threads for a given user. The masking module 114 stores the associations between the mask values and all active threads, thereby assuring that the proper mask is used for each thread. The masking module 114 loads the mask register value associated with a thread when the thread makes a memory access request. More than one thread may be assigned the same mask value if the threads are from the same operating system process, or from processes that share access to the same coherent memory. This may be the case, for example, if two threads are co-routines executed on behalf of a single user. As shown in FIG. 1, multiple users include a User A 120 (executing thread A 120) and a User B 122 (executing thread B 122). O/S 100 may support any number of users, although two users, each having a thread executing, are described in the example herein.

System 200 includes, as mentioned above, peripherals 118, such as the Input/Output interface or additional processors. In various embodiments, the masking module passes the associated mask value for each of the various users to the peripherals 118, so that peripherals 118, including the Input/Output interface or additional processors, may pass either a thread identifier or a mask to the processor 102 with memory addresses in order to enable coherent snooping of Input/Output or remote memory requests. In this way, the correct mask may be applied to a remote memory request so that the appropriate cache set may be snooped while the masking methods of the present disclosure are used.

Figure 2:
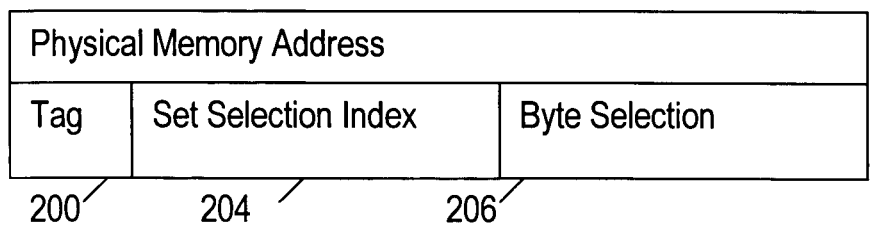
FIG. 2 shows a block diagram illustrating the addressing used for cache line addresses in an exemplary embodiment in accordance with the invention.

FIG. 2 shows a block diagram illustrating the addressing used for cache line addresses in accordance with an exemplary embodiment of the present disclosure. During program execution, physical memory addresses enter the cache controller 106 from the TLB 109. The physical memory address has at least the following components: an tag 200, a set selection index 204 and byte selection index 206. The set selection index 204 is used to select the set, and the tag 200 is used to choose the block by comparison with the blocks in the selected set. According to the method of the present disclosure, the value from the mask register 104 assigned to each user is hashed with (e.g., apply an exclusive OR function to) the bits in the set selection index 204 (i.e., the index bits) for each memory address accessed by execution of an instruction, resulting in randomized cache set mapping for each user, discernible only to each user with the unique mask value.

In various embodiments, the original values for the index bits are included in the tag 200 as well, such that when the mask value is hashed against the index bits, the actual original values from the index bits are still preserved to ensure accurate identification of cache hits.

Figure 3:
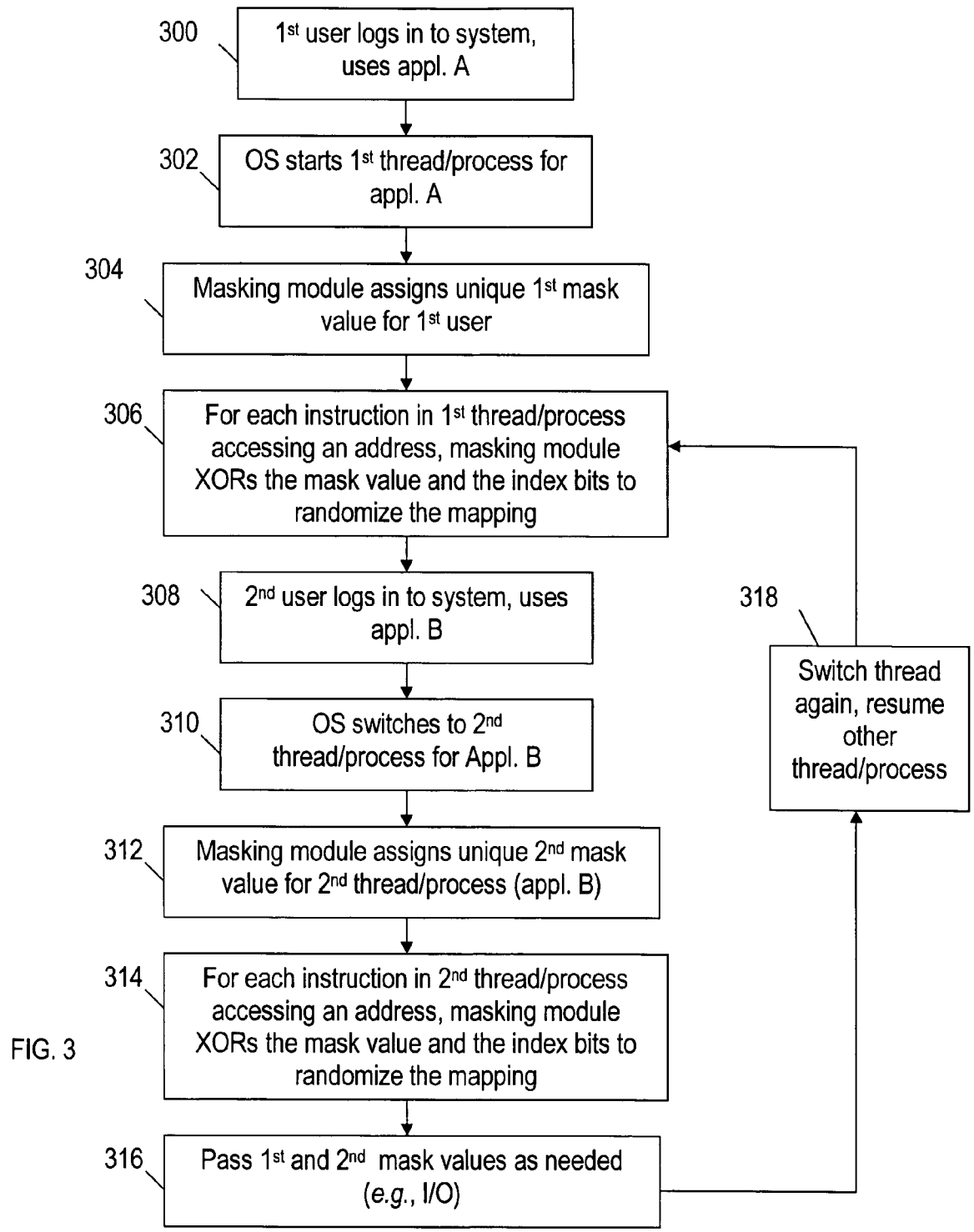
FIG. 3 shows a flowchart of a method of masking cache line addressing for each user in an exemplary embodiment in accordance with the invention.

Referring to FIG. 3, a flowchart is shown of an exemplary method of uniquely masking memory addresses for each user in accordance with the present disclosure. A first user logs in to the system 100 and begins to use application A (block 300). The O/S 112 starts to execute a first thread or process on behalf of the first user (block 302). The masking module 114 assigns a unique first mask value from the mask register 104 to the first user (block 304). For each instruction in the first thread or process for application A run by the first user, when the instruction calls for accessing a memory address, the masking module applies an exclusive OR function (i.e., XORs) to the mask value assigned to the first user thread and the index bits to randomize the cache set mapping for the first user (block 306).

At some point in time, a second user logs in to the system 100 and begins to use application B (block 308). In various embodiments, application B may be a different application from application A, or another instance of the same application as application A. In order for the second user to use application B, the O/S 112 starts to execute a second thread or process, switching from execution of the first thread or process (block 310). In various embodiments, switching between threads or processors occurs in such a negligible period of time as to be undetectable to both users. The masking module 114 assigns a unique second mask value from the mask register 104 to the second user (block 312). For each instruction in the second thread or process for application B executed on behalf of the second user, when the instruction calls for accessing a memory address, the masking module applies the exclusive OR function to the mask value assigned to the second user and the index bits to randomize the cache address mapping (block 314).

The mask values for the first user and the second user are passed to the peripherals 118 (such as the Input/Output interface), as necessary for execution of instructions in the thread or process, and to maintain the security imposed by the randomized addressing resulting from the masking (block 316).

The method continues, repeating as the processor 102 switches between threads or processes (block 318). The method applies when new applications are invoked by the same users, thus starting new threads or processes. Similarly, the method continues to repeat as the processor switches to new threads or processes executing when additional users log in and utilize applications.

A computer program product is any machine readable media, such as an Erasable Programmable Read Only Memory ("EPROM"), Read Only Memory ("ROM"), Random Access Memory ("RAM"), Dynamic Random Access Memory ("DRAM"), Compact Disk Read Only Memory ("CD-ROM"), disk drive, or tape, having recorded on it computer readable code that, when read and executed by a computer processor, instructs the processor to perform a particular function or sequence of functions. The computer readable code of a program product may be part or all of a program, such as an operating system or application masking module for masking addresses as between user threads. A computer system, such as illustrated in FIG. 1, having memory, the memory containing a masking module, is a computer program product.

The above discussion is meant to be illustrative of the principles and various embodiments of the present invention. Numerous variations and modifications will become apparent to those skilled in the art once the above disclosure is fully appreciated.

What is claimed is:

1. A system, comprising:
 a processor;
 a mask register accessible to the processor, the mask register stores a plurality of mask values;
 a cache memory coupled to the processor that provides information to the processor;
 an operating system that supports a plurality of users simultaneously; and
 a masking module accessible to the operating system that uniquely hashes set selection bits for addresses accessed by each user, thereby reducing risk of a timing attack by one user on another user;
 wherein only a portion of each address of the addresses is hashed.

2. The system of claim 1, wherein the masking module is stored in a system memory coupled to the processor that provides information to the cache memory upon the processor executing an instruction calling for a memory access operation.

3. The system of claim 1, wherein the information provided by the cache memory to the processor comprises at least one of instructions and data.

4. The system of claim 1, wherein the masking module uniquely masks memory addressing for each user by assigning one unique mask value from the mask register to each user, and hashing in the unique mask value for each user to each cache set selection accessed by instructions executed on behalf of the particular user.

5. The system of claim 4, wherein the masking module applies an exclusive OR ("XOR") function to the unique mask value and a set of index bits from an accessed memory address, to hash and thereby randomize cache set selection for each user.

6. The system of claim 1, further comprising at least an input/output interface, wherein the masking module passes the unique mask value for each user to the input/output interface, and wherein the input/output interface provides the unique mask value for each user to the processor when making coherent memory requests.

7. The system of claim 1, wherein the system comprises at least one of a virtual machine and a hypervisor environment.

8. The system of claim 1, wherein the masking module comprises computer readable code, the code when executed causes the processor to:
 assign a first mask value to a first user of the system and a second mask value to a second user of the system, the first mask value and the second mask value being unique to one another, wherein assignment of the first mask value and the second mask value reduces the risk of 1) a timing attack by any user on another user or 2) users contending for identical addresses.

9. The system of claim 1, wherein the masking module comprises computer readable code, the code when executed further causes the processor to:
 while executing a first instruction for the first user, apply the first mask value to set selection bits in a first memory address accessed by the first instruction; and
 while executing a second instruction for the second user, apply the second mask value to set selection bits in a second memory address accessed by the second instruction.

10. The system of claim 1, further comprising one or more additional processors that pass, via an interconnect at least one of 1) a mask value assigned for each user and 2) a thread identifier to the processor, along with a memory address for making a coherent memory request, thereby enabling coherent snooping of a masked cache set.

11. A method, comprising:
 assigning a first mask value to a first user of a computing system and a second mask value to a second user of the computing system, the first mask value and the second mask value being unique to one another;
 while executing a first instruction on behalf of the first user, applying the first mask value to set selection bits in a memory address accessed by the first instruction; and
 while executing a second instruction on behalf of the second user, applying the second mask value to set selection bits in a memory address accessed by the second instruction;
 whereby memory addressing maps differently for the first user and the second user to reduce risk of a timing attack by any user on another user;

wherein only a portion of each memory address of the memory addresses is masked.

12. The method of claim 11, wherein:
applying the first mask value to set selection bits further comprises applying an exclusive OR function to the first mask value bits and set selection bits in the memory address accessed by the first instruction; and
applying the second mask value to set selection bits further comprises applying an exclusive OR function to the second mask value bits and set selection bits in the memory address accessed by the second instruction.

13. The method of claim 11, further comprising preserving original values for the set selection bits by copying the set selection bits into a tag portion of the memory address prior to applying the mask value, thereby maintaining the unmasked set selection bits for identifying cache hits.

14. The method of claim 11, further comprising passing the first mask value and the second mask value to an Input/Output interface.

15. The method of claim 11, further comprising:
when switching between execution of instructions on behalf of two different users, saving the mask value for the stream being halted as part of an architected state for the stream being halted; and
loading the mask value for the stream being started from an architected state for the stream being started.

16. The method of claim 11, further comprising supporting the first user and the second user in a multiple-user computing system that comprises at least one of a virtual machine, a computer system configured for hyper-threading, and a hypervisor environment.

17. The method of claim 11, further comprising exempting from masking a range of addresses that are used by at least one of 1) operating system functions and 2) inter-user sharing functions.

18. A computer-readable medium storing a software program that, when executed by a processor, causes the processor to:
assign a first mask value to a first user of a computing system and a second mask value to a second user of the computing system, the first mask value and the second mask value being unique to one another;
while executing a first instruction on behalf of the first user, apply the first mask value to set selection bits in a memory address accessed by the first instruction; and
while executing a second instruction on behalf of the second user, applying the second mask value to set selection bits in a memory address accessed by the second instruction;
whereby memory addressing maps differently for the first user and the second user;
wherein only a portion of each memory address of the memory addresses is masked.

19. The computer-readable medium of claim 18 storing a software program that, when executed by a processor, further causes the processor to:
apply an exclusive OR ("XOR") function to the first mask value bits and set selection bits in the memory address accessed by the first instruction; and
apply an exclusive OR ("XOR") function to the second mask value bits and set selection bits in the memory address accessed by the second instruction.

20. The computer-readable medium of claim 18 storing a software program that, when executed by a processor, further causes the processor to:
preserve original values for the set selection bits by copying the set selection bits into a tag portion of the memory address prior to applying the mask value, thereby maintaining the unmasked set selection bits for identifying cache hits.

* * * * *